(12) United States Patent
Fujiwara et al.

(10) Patent No.: US 10,193,874 B2
(45) Date of Patent: Jan. 29, 2019

(54) COMMUNICATION SYSTEM

(71) Applicant: NATIONAL INSTITUTE OF INFORMATION AND COMMUNICATIONS TECHNOLOGY, Koganei-shi, Tokyo (JP)

(72) Inventors: Mikio Fujiwara, Koganei (JP); Masahide Sasaki, Koganei (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 275 days.

(21) Appl. No.: 15/347,078

(22) Filed: Nov. 9, 2016

(65) Prior Publication Data

US 2017/0134351 A1 May 11, 2017

(30) Foreign Application Priority Data

Nov. 10, 2015 (JP) ................................. 2015-220095

(51) Int. Cl.
| | |
|---|---|
| G06F 21/60 | (2013.01) |
| H04L 29/06 | (2006.01) |
| G06Q 40/02 | (2012.01) |
| H04L 9/06 | (2006.01) |
| H04L 9/32 | (2006.01) |
| H04L 9/08 | (2006.01) |
| H04L 9/12 | (2006.01) |
| H04W 12/06 | (2009.01) |

(52) U.S. Cl.
CPC ........... *H04L 63/061* (2013.01); *G06Q 40/02* (2013.01); *H04L 9/0631* (2013.01); *H04L 9/0838* (2013.01); *H04L 9/0852* (2013.01); *H04L 9/0877* (2013.01); *H04L 9/12* (2013.01); *H04L 9/3242* (2013.01); *H04L 9/3273* (2013.01); *H04L 63/0435* (2013.01); *H04W 12/06* (2013.01); *G06Q 2220/10* (2013.01); *H04L 2209/84* (2013.01)

(58) Field of Classification Search
CPC .................................. H04L 63/04; G06F 21/60
USPC ........ 713/189, 191, 171, 168, 150; 380/259, 380/260
See application file for complete search history.

(56) References Cited

U.S. PATENT DOCUMENTS

2014/0282951 A1* 9/2014 Ranade ................. H04L 63/062
726/6

FOREIGN PATENT DOCUMENTS

JP 2006203559 A 8/2006

\* cited by examiner

*Primary Examiner* — Izunna Okeke
(74) *Attorney, Agent, or Firm* — Holtz, Holtz & Volek PC

(57) ABSTRACT

Provided is a communication system in which a terminal communicates with a server via a portable communication network used for communication between smartphones. The smart phone includes first pre-shared key and encryption keys, the terminal includes a second pre-shared key, the server includes the encryption keys same as the encryption keys included in the smartphone, authentication between the terminal and the smartphone is performed by using the first pre-shared key and the second pre-shared key, and the terminal and the server perform communication via the smartphone by performing key synchronization of the encryption keys while setting a hash value of the encryption keys as an ID.

6 Claims, 4 Drawing Sheets

COMMUNICATION SYSTEM

BACKGROUND

Technical Field

The present invention relates to a communication system capable of performing secure communication utilizing a communication network provided for a portable communication device and communication thereof.

Related Art

As a method to information-theoretically perform secure communication, there is a method in which, for example, a key is securely shared between a transmitter and a receiver and encrypted by a one time pad (OTP), and communication is performed by using quantum key distribution (refer to JP 2006-203559 A).

The one time pad is a system in which encryption and decryption are performed by using a key having a length same as data to be transmitted and received, and the key once used is not used thereafter and abandoned. The key used as an encryption key on the transmitter side is needed to be used as a decryption key on the receiver side.

Additionally, as a different method, encrypted communication using an advanced encryption standard (AES) may be exemplified. The AES is common key block encryption in which text data having an indefinite length is sectioned sequentially from a head thereof into blocks having a length such as 128 or 256 bits, and encryption and decryption are performed for each of the blocks by an encryption key that is a common key.

By the way, in communication using an encryption key, in the case of using a predetermined encryption key out of a plurality of encryption keys shared by the transmitter side, an entire communication system is needed to be controlled so as to utilize a key same as this key as a decryption key on the receiver side. Such control is called key synchronization between the encryption key and the decryption key.

As an exemplary method to ensure this key synchronization, not only the encryption key but also a long-size key ID tag are utilized.

SUMMARY

By the way, an attempt is widely made to apply a communication method using current encryption to an existing communication system, but in such a case also, above-described key synchronization is needed to be ensured.

However, in some types of a communication terminal constituting a current communication system, key synchronization may be hardly performed by a method in the related art.

For example, a communication network facilitated for portable communication devices such as a smartphone and a tablet terminal (hereinafter referred to as portable communication network) is a communication network facilitated in a broad range, and it is very preferable to apply a communication method using encryption to this communication network.

However, in the case of assuming that the communication method using a one time pad or an AES is applied to the portable communication network, a system for key synchronization in the related art is so complex that it is difficult to load the system on the portable communication device.

Therefore, the present invention is invented considering the above-described problems, and directed to providing a communication system capable of performing secure communication via a portable communication device and a portable communication network by using a key synchronization method that can be easily loaded on the portable communication device.

A communication system according to a first invention is a communication system in which a terminal communicates with a server via a portable communication network used for communication between portable communication devices. The portable communication device includes a first pre-shared key and an encryption key, the terminal includes a second pre-shared key, the server has the encryption key same as the encryption key included in the portable communication device, authentication between the terminal and the portable communication device is performed by using the first pre-shared key and the second pre-shared key, and the terminal communicates with the server via the portable communication device by performing key synchronization of the encryption key while setting a hash value of the encryption key as an ID.

In a communication system according to a second invention, the hash value is generated by using a strongly universal hash function by a Toeplitz matrix in the first invention.

In a communication system according to a third invention, the portable communication device and the server respectively include same plurality of different encryption keys and perform communication by using a one time pad, and furthermore, the encryption keys of the portable communication device and the server are respectively supplied to the portable communication device and the server by using quantum key distribution from a quantum key generation device in the first invention or the second invention.

In a communication system according to a fourth invention, the portable communication device communicates with the server by using an advanced encryption standard (AES) in the first invention or the second invention.

In a communication system according to a fifth invention, the terminal is a control unit of an automobile, the portable communication device is a smartphone, and the communication system is a system to perform travel control for the automobile in any one of the first to fourth inventions.

In a communication system according to a sixth invention, the terminal is a personal computer, the portable communication device is a smartphone, and the communication system is a system to perform internet banking in any one of the first to fourth inventions.

According to the present invention having the above-described structure, it is possible to provide a communication system capable of performing secure communication via the portable communication device and the portable communication network by using a key synchronization method that can be easily loaded on the portable communication device.

DETAILED DESCRIPTION

Communication systems according to embodiments of the present invention will be described below.

Figure 1:
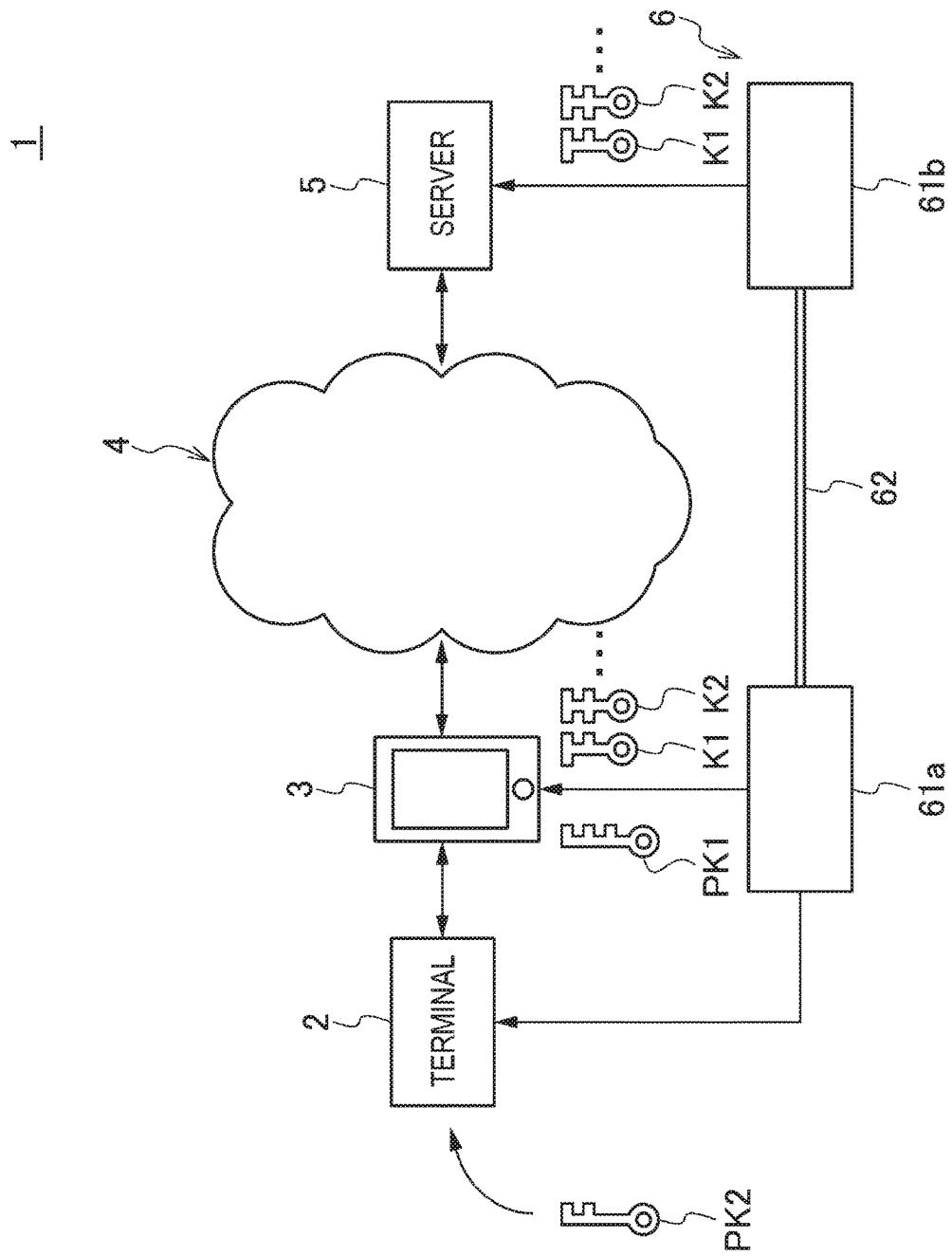
FIG. 1 is a schematic diagram illustrating a structure common in communication systems according to respective embodiments of the present invention.

FIG. 1 is a schematic diagram illustrating a structure common in the communication systems 1 according to the respective embodiments of the present invention. A communication system 1 according to the present invention is formed of a terminal 2, smartphone 3 as a portable communication device, a server 5, and a quantum key distribution system 6.

The terminal 2 represents various kinds of devices that perform communication with the server 5. As the terminal 2, a control unit 2A of an automobile 7 is exemplified in a first embodiment described later (refer to FIG. 3), and a personal computer 2B to perform internet banking is exemplified in a second embodiment (refer to FIG. 4), in which the communication system 1 is concretely described.

In a storage unit not illustrated provided inside the terminal 2, a second pre-shared key PK2 used at the time of authentication with the smartphone 3 is stored.

The smartphone 3 is a terminal to perform various kinds of communication via the portable communication network 4 facilitated for portable communication devices such as a smartphone and a tablet terminal. In the respective embodiments of the present invention, the terminal 2 performs encrypted communication with the server 5 by using the portable communication network 4 via the smartphone 3.

In a storage unit not illustrated provided inside the smartphone 3, a first pre-shared key PK1 used at the time of authentication with the terminal 2 and a plurality of encryption keys K1, K2, . . . used for encryption by one time pad are stored.

The first pre-shared key PK1 is preliminarily stored in the smartphone 3 by an optional method. In the first and second embodiments, the first pre-shared key PK1 is provided to the smartphone 3 by wired or wireless communication from a pre-shared key providing terminal not illustrated provided inside an automobile dealer 8A (refer to FIG. 3) or a bank 8B (refer to FIG. 4), and stored in the smartphone 3.

For the server 5, various kinds of servers are assumed to perform communication with the terminal 2 via the smartphone 3. In the first embodiment described later, the server 5 that manages information related to monitoring/controlling for the automobile 7 by transmitting and receiving information with a control panel 21 adapted to monitor/control respective apparatuses mounted on the automobile 7 is exemplified as the server 5 (refer to FIG. 3). Furthermore, in the second embodiment, the server 5 that manages information related to internet banking is exemplified as the server 5 (refer to FIG. 4).

The quantum key distribution system 6 is a quantum key distribution platform as an encryption generation device, and formed of a transmitter 61a and a receiver 61b connected by an optical fiber 62.

Meanwhile, in descriptions for the respective embodiments, "distribution" includes not only quantum key distribution and information transmission by a trusted courier described later but also a concept of pre-shared key transmission by wire or wireless.

The transmitter 61a and the receiver 61b are respectively terminals capable of generating, transmitting, receiving, and storing an encryption key. In the present embodiment, the transmitter 61a and the receiver 61b are described separately for convenience, but actually correspond to a terminal having both functions of transmitting and receiving the encryption key.

The transmitter 61a and the receiver 61b generate encryption keys K1, K2, . . . used for the one time pad. Furthermore, the encryption keys K1, K2, . . . are distributed from the transmitter 61a to the terminal 2 and also from the receiver 61b to the server 5.

Distribution of the encryption keys K1, K2, . . . from the transmitter 61a to the terminal 2 and distribution of the encryption keys K1, K2, . . . from the receiver 61b to the server 5 are performed inside a trusted node (region where security is strictly ensured) in the present embodiment.

The trusted courier is a distributor that is strictly managed and distributes important information without leaking the information to anyone outside an organization. In the present embodiment, in the trusted node, information is distributed by storing the information in an external storage device and transferring the same.

Meanwhile, a pair of the transmitter 61a and receiver 61b is illustrated as the quantum key distribution platform in FIG. 1, but the present invention is not limited thereto, and it may be possible to have a structure in which plural pairs of the transmitters and receivers are connected inside a node physically and electromagnetically shielded from the outside.

Figure 2:
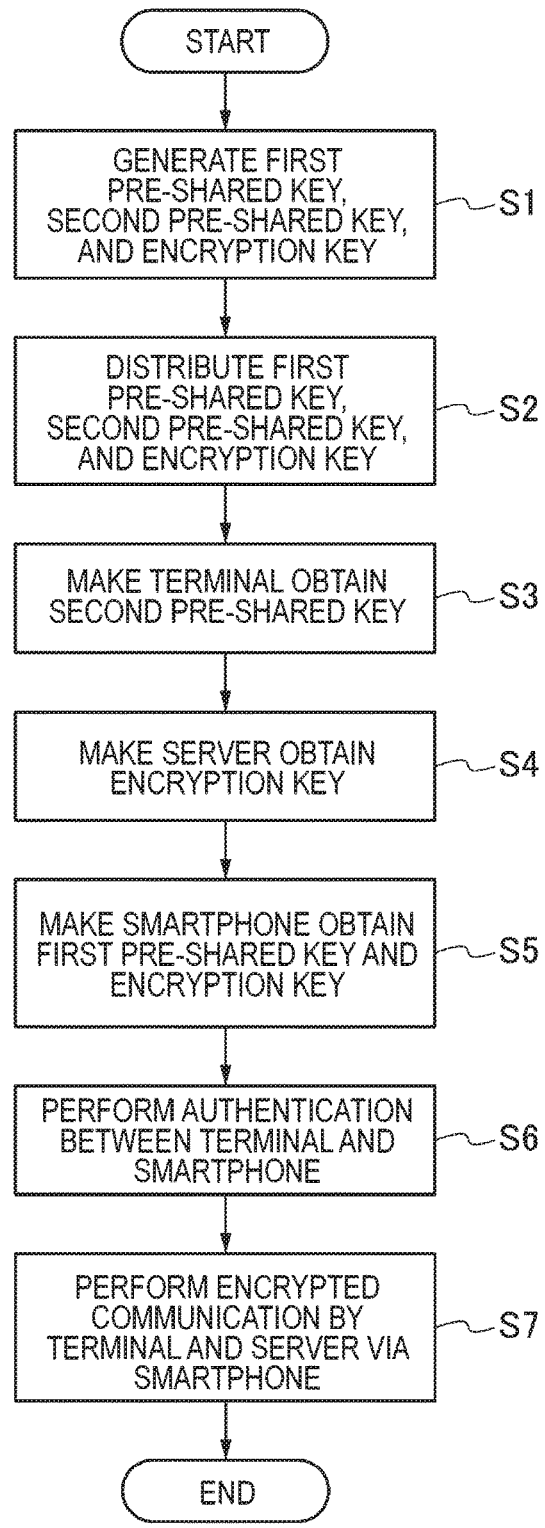
FIG. 2 is a flowchart illustrating an outline of processing common in the communication systems according to the respective embodiments of the present invention.

Next, an outline of processing by the communication system 1 having the above-described structure will be described. FIG. 2 is a flowchart illustrating the outline of processing common in the communication systems 1, 1A, 1B according to the respective embodiments of the present invention.

First, the first pre-shared key PK1, second pre-shared key PK2, and encryption keys K1, K2, . . . are generated (Step S1). The first pre-shared key PK1 and second pre-shared key PK2 are respectively generated by a pre-shared key providing terminal not illustrated established parallelly inside a facility and the like provided with the transmitter 61a. The encryption keys K1, K2, . . . are generated by the quantum key distribution system 6.

Next, the first pre-shared key PK1 and the second pre-shared key PK2 are distributed (Step S2). The first pre-shared key PK1 is distributed from the pre-shared key providing terminal to the smartphone 3. The second pre-shared key PK2 is distributed from the pre-shared key providing terminal to the terminal 2.

Next, the terminal 2 obtains the second pre-shared key PK2 (Step S3).

Subsequently, the server 5 obtains the encryption keys K1, K2, . . . inside the trusted node from the receiver 61b (Step S4).

Next, the smartphone 3 obtains the first pre-shared key PK1 from the pre-shared key providing terminal by wired or wireless communication, and also obtains the encryption keys K1, K2, . . . inside the trusted node from the transmitter 61a (Step S5).

Meanwhile, Steps S3 to S5 may be performed in an optional order or may be performed at the same time.

Next, authentication between the terminal 2 and the smartphone 3 is performed (Step S6). Authentication between the terminal 2 and the smartphone 3 is performed by using the first pre-shared key PK1 and the second pre-shared key PK2.

Meanwhile, an aspect is not limited thereto in the present invention, and there may also be an aspect in which a hash value of subscriber identity module (SIM) information of the smartphone 3 is used in addition to the first pre-shared key PK1 and the second pre-shared key PK2.

Next, encrypted communication via the smartphone 3 by the terminal 2 and the server 5 is started (Step S7).

This encrypted communication is performed by the one time pad using the encryption keys K1, K2, . . . via the portable communication network 4.

At this point, key synchronization between the smartphone 3 and the server 5 is performed by setting the hash value of the encryption keys K1, K2, . . . as an ID.

Specifically, the hash value is generated by the smartphone 3 and the server 5 from the encryption keys K1, K2, . . . , using a strongly universal hash function by a Toeplitz matrix. A random number needed for generating the hash value (hashing) is preliminarily shared between the smartphone 3 and the server 5 in an optional method.

Then, an apparatus to be a transmitting side out of the terminal 2 or the server 5 transmits, to an apparatus to be a receiving side, ID data related to the encryption key used to encrypt data preliminarily scheduled to be transmitted.

Then, the apparatus to be the receiving side receives the ID data transmitted from the transmitting side, and makes search on the encryption keys K1, K2, . . . stored in the storage unit for an encryption key having an ID same as the received ID.

After that, when the encryption key having the same ID is found as a result of search, the apparatus to be the receiving side starts encrypted receiving action from the transmitting side, and decrypts the received data with the encryption key upon receipt.

Thus, a method of performing key synchronization between the smartphone 3 and the server 5 by setting the hash value of the encryption keys K1, K2, . . . as the ID can reduce an amount of information processing required in the smartphone 3. Therefore, the method can be easily loaded on the smartphone 3.

Then, since data receiving action is performed only in the case where the receiving side has the encryption key having the ID same as the ID data transmitted from the transmitting side, spoofing against the transmitting side can be prevented, and data transmission and receipt can be performed securely.

First Embodiment

Figure 3:
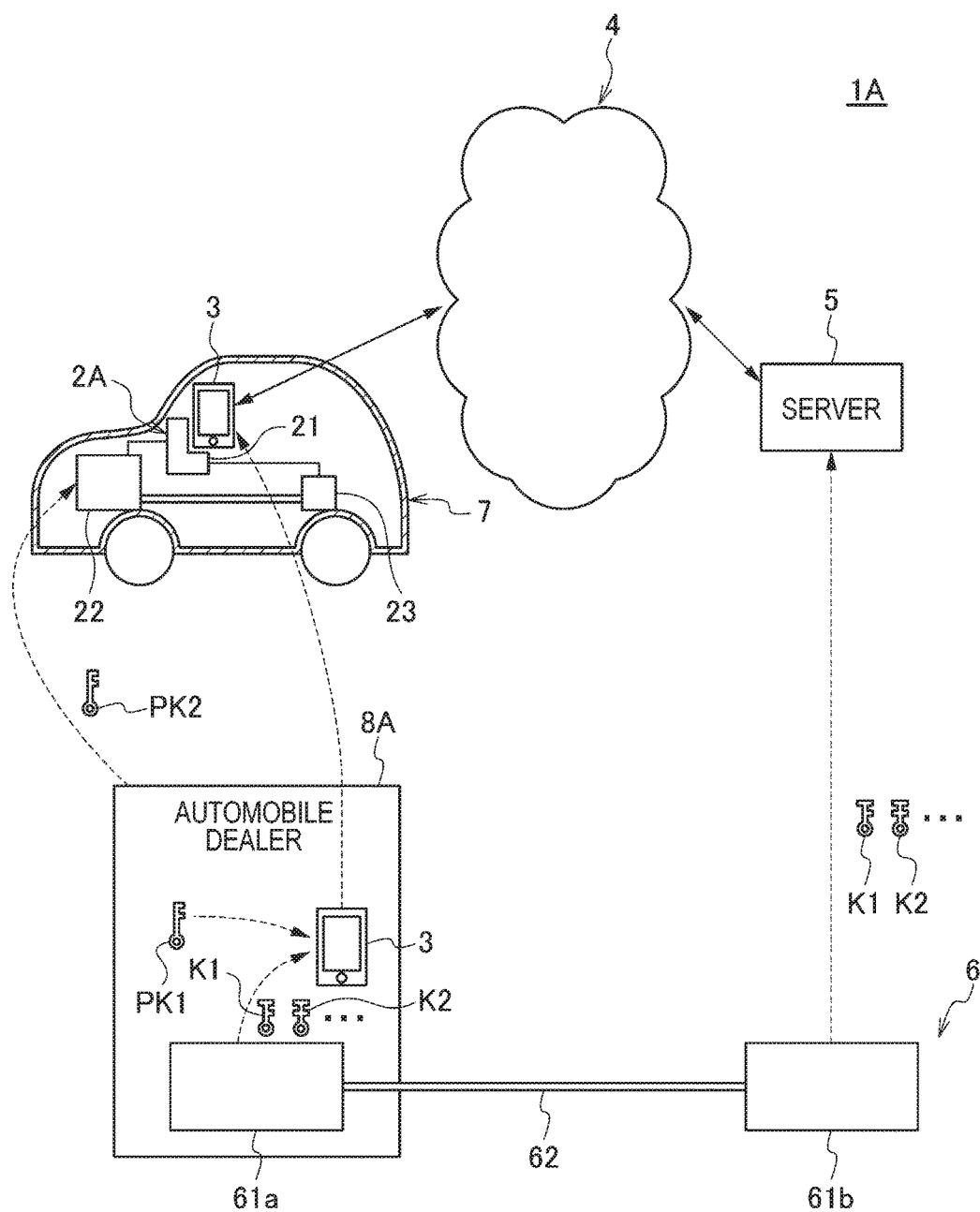
FIG. 3 is a schematic diagram illustrating an outline of the communication system according to a first embodiment.

Next, a communication system according to a first embodiment of the present invention will be described. FIG. 3 is a schematic diagram illustrating an outline of a communication system 1A according to the first embodiment.

In the communication system 1A according to the first embodiment, travel control for an automobile is performed by performing encrypted communication between a control unit 2A of an automobile 7 and a server 5 via a smartphone 3.

The automobile 7 is an automobile capable of performing not only normal manual operation by an operator but also automatic operation by cooperative operation between the control unit 2A and the server 5.

The control unit 2A is formed of: monitoring/controlling mechanisms for respective components of the automobile 7, such as an a steering monitoring/controlling mechanism 22 adapted to monitor a steering state and control operation thereof, and a differential monitoring/controlling mechanism 23 adapted to monitor a differential state and control operation thereof; and a control panel 21 to function an interface for these monitoring/controlling mechanisms.

The control panel 21 performs communication with the monitoring/controlling mechanisms for the respective components of the automobile 7, and performs communication with the smartphone 3 when information obtained from the respective monitoring/controlling mechanisms is provided to the operator, operation related to the respective monitoring/controlling mechanisms is conducted by the operator, and when the control unit 2A performs communication with the server 5.

The manual operation mode and the automatic operation mode of the automobile 7 can be switched by the operator operating the control panel 21.

The server 5 receives and stores various kinds of information from the control unit 2A of the automobile 7 via a portable communication network 4 for the smartphone 3. Furthermore, based on the received various kinds of information, the server 5 transmits, to the control unit 2A, information provided for normal manual operation by the operator of the automobile 7 and various kinds of information provided for automatic operation at the time of automatic operation of the automobile 7.

Since communication between the server 5 and the control unit 2A is performed by using the existing portable communication network 4 for the smartphone 3, there is no special infrastructure development required. Therefore, a system can be built at low cost, and also the system can be quickly diffused.

In the above-described communication system 1A, when the control unit 2A of the automobile 7 is hacked from the outside during automatic operation, automobile 7 may not be able to be performed safely, and in the worst case, an accident that endangers the operator's life may be caused.

Additionally, when the control unit 2A is hacked from the outside during manual operation also, there may be risks in which, for example, an incorrect driving route is displayed on a car navigation system, data of a travel route obtained from a global positioning system (GPS) is leaked, and information related to privacy such as a drop-by place is illegally retrieved by an outside person.

Therefore, it is necessary to prevent communication performed between the control unit 2A and the server 5 via the smartphone 3 from being intercepted from the outside, spoofed, and the like.

Accordingly, in the communication system 1A, spoofing of an operator is prevented by performing authentication between the smartphone 3 owned by the operator and the control unit 2A of the automobile 7 by using a first pre-shared key PK1 and a second pre-shared key PK2.

Furthermore, communication security is ensured by performing encrypted communication by the one time pad between the smartphone 3 and the server 5 using the encryption keys K1, K2, . . . .

Encrypted communication according to the present embodiment will be described below in detail.

First, at the time of selling or inspecting the automobile 7, the operator comes to an automobile dealer 8A and also the automobile 7 is to be located in the automobile dealer 8A.

At this point, the first pre-shared key PK1 is distributed to the smartphone 3 owned by the operator, and also the second pre-shared key PK2 is distributed to the control panel 21 of the control unit 2A.

At this point, there may an aspect in which a pre-shared key providing terminal that generates the first pre-shared key PK1 and the second pre-shared key PK2 is located inside the automobile dealer 8A and these keys are provided from this pre-shared key providing terminal. Alternatively, there may also be an aspect in which the pre-shared key providing terminal is disposed in a different facility and distributed to the automobile dealer 8A by a portable recording medium and the like.

Additionally, the encryption keys K1, K2, . . . are distributed inside a trusted node to the smartphone 3 from a transmitter 61a of a quantum key distribution system 6 provided inside the automobile dealer 8A. Furthermore, the encryption keys K1, K2, . . . are distributed inside the trusted node to the server 5 from a receiver 61b located inside a facility provided with the server 5

In the case where the control unit 2A of the automobile 7 communicates with the server 5 after the automobile 7 is sold or inspected, connection between the control unit 2A and the smartphone 3 is established first.

The connection is established by performing mutual authentication by using the first pre-shared key PK1 and the second pre-shared key PK2 after the control panel 21 of the control unit 2A is connected to the smartphone 3 by wire or wireless.

Next, encrypted communication is performed between the control unit 2A and the server 5 via the portable communication network 4 by using the smartphone 3.

This encrypted communication is performed by the one time pad using the encryption keys K1, K2, . . . .

Additionally, key synchronization at the time of encrypted communication is performed by using, as an ID, a hash value generated from the encryption keys K1, K2, . . . respectively by a strongly universal hash function by a Toeplitz matrix.

Second Embodiment

Figure 4:
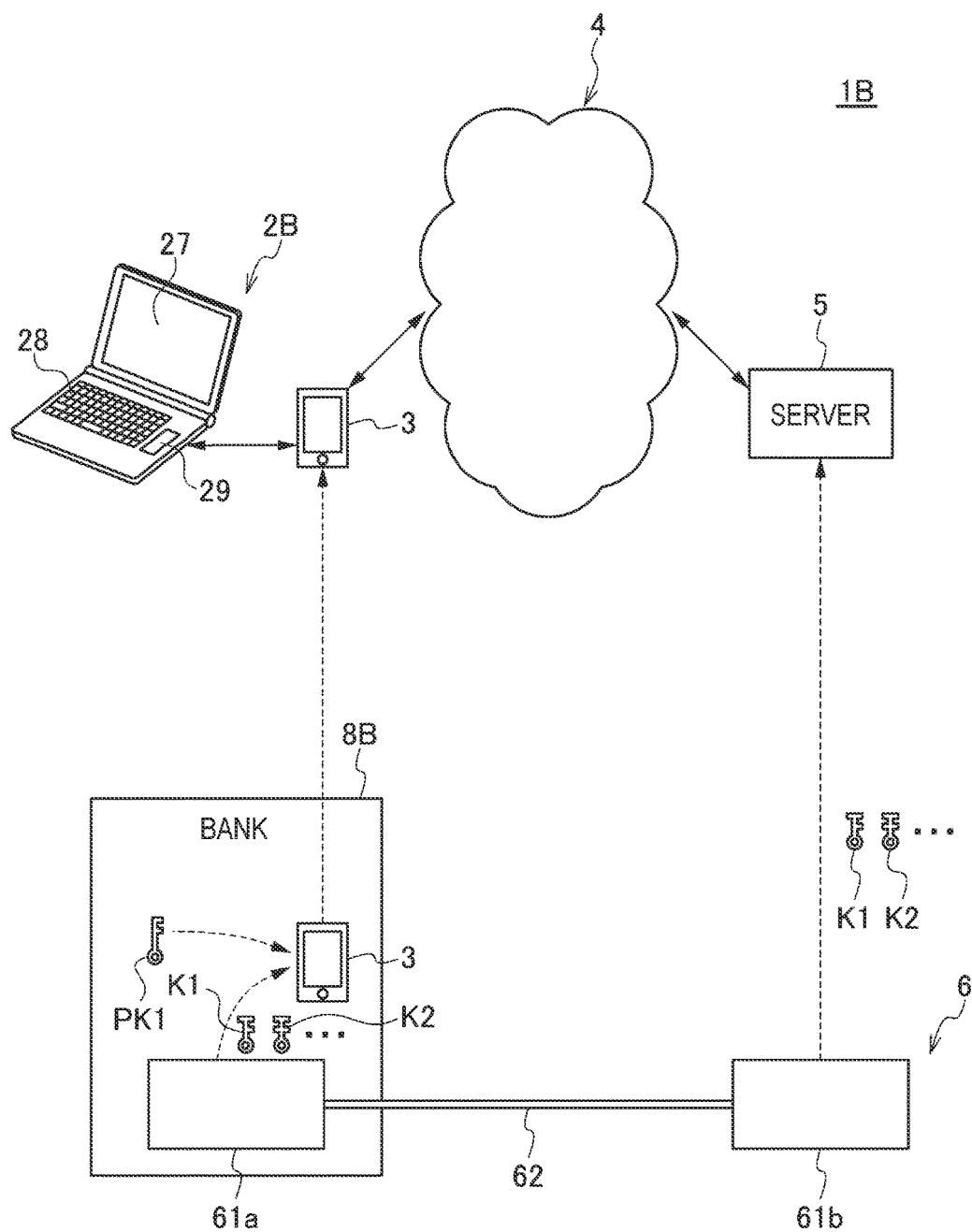
FIG. 4 is a schematic diagram illustrating an outline of the communication system according to a second embodiment.

Next, a communication system according to a second embodiment of the present invention will be described. FIG. 4 is a schematic diagram illustrating an outline of a communication system 1B according to the second embodiment.

In the communication system 1B according to the second embodiment, a personal computer 2B adapted to perform internet banking and a server 5 perform encrypted communication via a smartphone 3.

The personal computer 2B is formed of a display 27 adapted to display various kinds of information for a user, a keyboard 28 adapted to receive operation by the user, and a communication port 29 adapted to perform communication with the smartphone 3.

In a memory not illustrated provided in the personal computer 2B, a second pre-shared key PK2 provided from a pre-shared key providing terminal is stored.

There may be an aspect in which the pre-shared key providing terminal is provided inside a bank 8B that is a branch of a banking group providing internet banking service, a user brings the personal computer 2B to the bank 8B at the time of requesting the internet banking so as to utilize the service, and the second pre-shared key PK2 provided from a bank employee is stored in the personal computer 2B.

Alternatively, there may also be an aspect in which the pre-shared key providing terminal is a server provided at a predetermined facility of the banking group providing the internet banking service, and the second pre-shared key PK2 is also downloaded together at the time of downloading software used for internet banking onto the personal computer 2B from the server.

The server 5 receives various kinds of information such as credit, remittance, and the like related to the internet banking from the personal computer 2B via a portable communication network 4 for the smartphone 3, and stores the same. Furthermore, the server 5 transmits, to the personal computer 2B, various kinds of information provided for the internet banking based on the received various kinds of information.

Since communication between the server 5 and the personal computer 2B is performed by using the existing portable communication network 4 for the smartphone 3, there is no special infrastructure development required.

Therefore, a system can be built at low cost, and also the system can be quickly diffused.

In the above-described communication system 1B, there may be possibility in which internet banking cannot be securely performed and serious financial damage may be caused by the personal computer 2B being hacked at the time of utilizing the internet banking and data to be transmitted and received being altered.

Therefore, communication performed between the personal computer 2B and the server 5 via the smartphone 3 is needed to be prevented from being intercepted from the outside, spoofed, and the like.

Accordingly, in the communication system 1B, spoofing of the user is prevented by performing authentication between the smartphone 3 owned by the user and the personal computer 2B by using a first pre-shared key PK1 and a second pre-shared key PK2.

Furthermore, communication security is ensured by performing encrypted communication by the one time pad between the smartphone 3 and the server 5 using the encryption keys K1, K2, . . . .

Encrypted communication according to the present embodiment will be described below in detail.

First, a user who intends to utilize internet banking service visits the bank 8B that is the branch of the banking group providing the internet banking.

Then, in the bank 8B, user information is registered and also the first pre-shared key PK1 and the encryption keys K1, K2, . . . are distributed to the user's smartphone 3.

There may be an aspect in which a pre-shared key providing terminal to generate the first pre-shared key PK1 is located inside the bank 8B, and the pre-shared keys are provided from this pre-shared key providing terminal. Alternatively, there may also be an aspect in which the pre-shared key providing terminal is disposed in a different facility and distributed to the bank 8B by a portable recording medium and the like.

The encryption keys K1, K2, . . . are distributed to the smartphone 3 via a trusted courier from a transmitter 61a of a quantum key distribution system 6 provided inside the bank 8B. Furthermore, the encryption keys K1, K2, . . . are distributed from a trusted node to the server 5 from a receiver 61b located inside the facility provided with the server 5.

In the case where the personal computer 2B communicates with the server 5 in order to actually perform internet banking after a user comes to the bank 8B, connection between the personal computer 2B and the smartphone 3 is established first.

This connection is established by performing mutual authentication by using the first pre-shared key PK1 and the second pre-shared key PK2 after the personal computer 2B is connected to the smartphone 3 via a communication port 29.

Next, encrypted communication is performed between the personal computer 2B and the server 5 via the portable communication network 4 by using the smartphone 3.

This encrypted communication is performed by the one time pad using the encryption keys K1, K2, . . . .

Additionally, key synchronization at the time of encrypted communication is performed by using, as an ID, a hash value generated from the encryption keys K1, K2, . . . respectively by a strongly universal hash function by a Toeplitz matrix.

Modified Example

In the respective embodiments described above, communication between the terminal 2 and the server 5 is performed by using encryption by the one time pad. However, the present invention is not limited thereto, and there may also be an aspect of using the AES.

In the case of using the AES, a hash value is generated by using the strongly universal function by the Toeplitz matrix, and key synchronization is performed by setting the same as an ID.

By adopting such a key synchronization method, the method can be easily loaded to the portable communication device same as the above-described embodiments, and secure communication can be performed via the portable communication device and the portable communication network.

FIG. 1
2: TERMINAL
5: SERVER
FIG. 2
START
S1: GENERATE FIRST PRE-SHARED KEY, SECOND PRE-SHARED KEY, AND ENCRYPTION KEY
S2: DISTRIBUTE FIRST PRE-SHARED KEY, SECOND PRE-SHARED KEY, AND ENCRYPTION KEY
S3: MAKE TERMINAL OBTAIN SECOND PRE-SHARED KEY
S4: MAKE SERVER OBTAIN ENCRYPTION KEY
S5: MAKE SMARTPHONE OBTAIN FIRST PRE-SHARED KEY AND ENCRYPTION KEY
S6: PERFORM AUTHENTICATION BETWEEN TERMINAL AND SMARTPHONE
S7: PERFORM ENCRYPTED COMMUNICATION BY TERMINAL AND SERVER VIA SMARTPHONE
END
FIG. 3
5: SERVER
8A: AUTOMOBILE DEALER
FIG. 4
5: SERVER
8B: BANK

What is claimed is:

1. A communication system in which a terminal communicates with a server via a portable communication network used for communication between portable communication devices, wherein:
the portable communication device includes a first pre-shared key and an encryption key,
the terminal includes a second pre-shared key,
the server has an encryption key which is the same as the encryption key included in the portable communication device,
authentication between the terminal and the portable communication device is performed by using the first pre-shared key and the second pre-shared key,
the terminal communicates with the server via the portable communication device by performing key synchronization of the encryption key while setting a hash value of the encryption key as an ID,
the hash value is generated by using a strongly universal hash function by a Toeplitz matrix, and
the portable communication device and the server respectively include a same plurality of different encryption keys and perform communication by using a one time pad, and the encryption keys of the portable communication device and the server are respectively supplied to the portable communication device and the server by using quantum key distribution from a quantum key generation device.

2. The communication system according to claim 1, wherein the portable communication device communicates with the server by using an advanced encryption standard (AES).

3. The communication system according to claim 1, wherein the terminal is a control unit of an automobile, the portable communication device is a smartphone, and the communication system is a system to perform travel control for the automobile.

4. The communication system according to claim 1, wherein the terminal is a personal computer, the portable communication device is a smartphone, and the communication system is a system to perform internet banking.

5. The communication system according to claim 2, wherein the terminal is a control unit of an automobile, the portable communication device is a smartphone, and the communication system is a system to perform travel control for the automobile.

6. The communication system according to claim 2, wherein the terminal is a personal computer, the portable communication device is a smartphone, and the communication system is a system to perform internet banking.

* * * * *